(12) United States Patent
Dillinger

(10) Patent No.: US 10,710,484 B2
(45) Date of Patent: Jul. 14, 2020

(54) HEADREST BODY AND HEADREST

(71) Applicant: Adient Luxembourg Holding S.à.r.l., Luxembourg (LU)

(72) Inventor: Thomas Dillinger, Ratingen (DE)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 0 days.

(21) Appl. No.: 15/741,324

(22) PCT Filed: Jul. 1, 2016

(86) PCT No.: PCT/EP2016/065599
§ 371 (c)(1),
(2) Date: Jan. 2, 2018

(87) PCT Pub. No.: WO2017/005660
PCT Pub. Date: Jan. 12, 2017

(65) Prior Publication Data
US 2018/0264982 A1    Sep. 20, 2018

(30) Foreign Application Priority Data
Jul. 3, 2015    (DE) .................. 10 2015 212 510

(51) Int. Cl.
*B60N 2/809*    (2018.01)
*B60N 2/70*    (2006.01)

(52) U.S. Cl.
CPC .............. *B60N 2/809* (2018.02); *B60N 2/70* (2013.01)

(58) Field of Classification Search
CPC ...................................................... B60N 2/809
See application file for complete search history.

(56) References Cited

U.S. PATENT DOCUMENTS

| | | | |
|---|---|---|---|
| 7,621,597 B2 | 11/2009 | Oda | |
| 2005/0127735 A1 | 6/2005 | Munsch | |
| 2010/0060066 A1 | 3/2010 | Hojnacki et al. | |
| 2013/0313881 A1 | 11/2013 | Kao | |

FOREIGN PATENT DOCUMENTS

| | | |
|---|---|---|
| DE | 19 50 737 U | 12/1966 |
| DE | 32 26 149 A1 | 1/1984 |
| DE | 10 2005 015 292 B3 | 11/2006 |
| EP | 1 097 837 A2 | 5/2001 |
| EP | 1 752 334 A2 | 2/2007 |
| JP | 59-179657 U1 | 11/1984 |
| JP | 59-196156 U1 | 12/1984 |
| JP | H09-206162 A | 8/1997 |
| JP | 2003-327032 A | 11/2003 |
| JP | 2008-86708 A | 4/2008 |
| JP | 2012-121465 A | 6/2012 |
| JP | 2012-200610 A | 10/2012 |
| WO | 2009/014329 A2 | 1/2009 |
| WO | 2013/004696 A2 | 1/2013 |

*Primary Examiner* — Anthony D Barfield
(74) *Attorney, Agent, or Firm* — Marshall & Melhorn, LLC

(57) ABSTRACT

A headrest body (1) for a headrest (3) is formed as at least one frame (1.1) having one or more supporting elements (1.4). The one or more supporting elements (1.4) are located on an inside and form a supporting surface (1.3). The one or more supporting elements (1.4) are formed by primary forming from a plastics material, in particular a material free of foam materials, or a composite material.

18 Claims, 17 Drawing Sheets

B-B

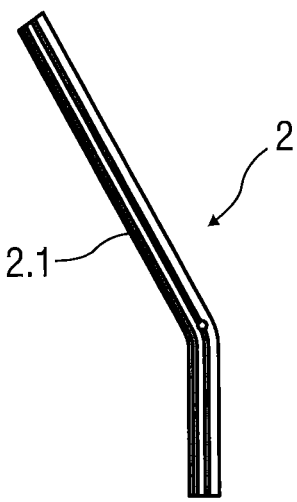
FIG 7A
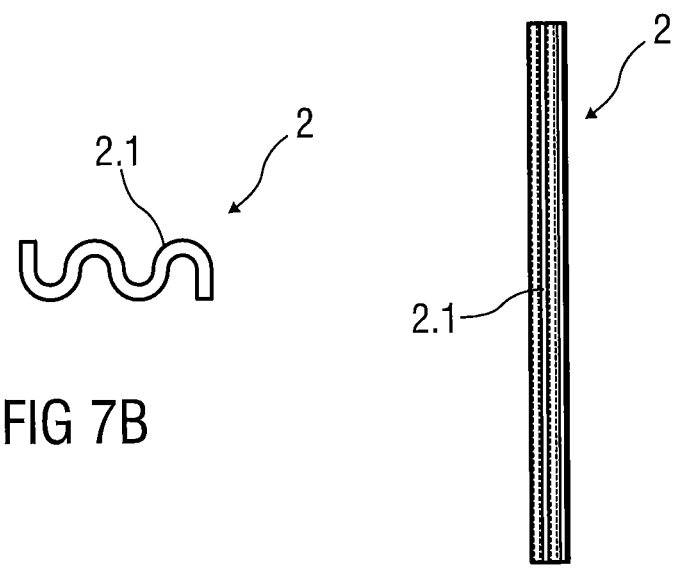
FIG 7B
FIG 7C

HEADREST BODY AND HEADREST

CROSS REFERENCE TO RELATED APPLICATIONS

This application is a United States National Phase Application of International Application PCT/EP2016/065599, filed Jul. 1, 2016, and claims the benefit of priority under 35 U.S.C. § 119 of German Application 10 2015 212 510.6, filed Jul. 3, 2015, the entire contents of which are incorporated herein by reference.

FIELD OF THE INVENTION

The invention relates to a headrest body for a headrest, to a headrest holder and to a headrest.

BACKGROUND OF THE INVENTION

Headrests for vehicles, in which a filling material in the form of a foam is arranged between an outer cover and an inner connecting part for attaching the headrest to a headrest holder, are known in general from the prior art. In the case of known headrests, provision is made for example for a preformed foam body to be used to fill the headrest body.

DE 10 2005 015 292 B3 discloses such a headrest for a vehicle. The headrest comprises a headrest body and a headrest holder, wherein a cover is provided on the outer side of the headrest body. A connecting part for connecting the headrest holder to the headrest body is provided within the headrest body, wherein a filling material formed from foam is arranged between the connecting part and the cover. The filling material is in liquid form in its processing state, wherein the connecting part and the cover define a substantially impermeable spatial region with respect to the filling material in its processing state. Furthermore, a method for producing the headrest is described.

SUMMARY OF THE INVENTION

The present invention is based on the object of specifying a headrest body which is simplified in comparison to the prior art and is cost-effective, and also an improved headrest holder and a headrest.

The headrest body according to the invention for a headrest is configured as at least one frame with one or more inner flexible support elements forming a support surface, and is formed from a plastics material, in particular from a material free of foamed materials, or from a composite material, in particular from a fiber composite material, for example glass-fiber-reinforced or carbon-fiber-reinforced plastic, by primary forming.

The plastics material is in particular a thermoplastic, for example polypropylene, polyethylene, polycarbonate-acrylonitrile-butadiene-styrene (PC-ABS).

The headrest body is in particular of single-part design. In this exemplary embodiment, the frame and the flexible support elements are formed together from a plastics material by primary forming. Alternatively, the headrest body can be of multipart design.

Such a headrest body can be produced cost-effectively and has good damping and support properties even without the use of foamed materials (foam-free). In particular, the use of foamed materials is completely dispensed with here.

The headrest body is formed, for example, from an impact-resistant elasto-plastic or thermoplastic material, for example a thermoplastic, in particular from polypropylene, urethane, polyurethane, polyethylene or polycarbonate-acrylonitrile-butadiene-styrene (PC-ABS). In one possible embodiment, the headrest body is formed by injection molding of a material free from foamed plastic materials or by multi-component injection molding from a plurality of plastics materials. Alternatively, the headrest body can also be formed by deformation, in particular compression molding or stamping.

In one possible embodiment, the support element(s) forms/form an ergonomically configured support surface of the headrest body (also called head contact surface). In particular, the support element(s) forms/form a concavely shaped support surface. The support surface here is shaped concavely in such a manner that it has a larger support surface than conventional headrest bodies. In particular, the headrest body with a concavely shaped support surface in combination with the frame makes it possible for a head, in particular the back of the head, to rest on the support surface and to be supported laterally therefrom by the frame.

For this purpose, the support element or the support elements is or are ergonomically shaped and configured in the support direction, in particular is or are adapted to a head, thus permitting comfortable support and positioning for a head and in particular a small lateral contact and support surface stabilizing the head. In other words: the support element or the support elements itself/themselves is or are ergonomically shaped in order to form the ergonomically configured support surface. Owing to the ergonomic shaping of the support element or the support elements, the headrest body can be formed without foam. It is possible for only the support element or the support elements to be provided with cushioning.

Owing to the ergonomically, in particular concavely shaped support surface, the cushioning can also be omitted. Such a headrest body therefore has a concavely shaped and cushion-free support surface.

Alternatively, the support surface can have a substantially smaller cushioning than known headrest bodies. A headrest body is customarily provided with cushioning of approx. 25 mm. In one possible embodiment with a correspondingly concavely shaped support surface, the headrest body, in particular the support element or the support elements, is provided with a cushioning of less than 20 mm, in particular less than 15 mm, preferably with a cushioning within a range of 10 mm to 5 mm.

In comparison to conventional headrest bodies, the cushion-free headrest body or the headrest body having a smaller cushioning leads to a significantly smaller movement of the head in the event of a rear impact. Consequently, both the comfort and the safety are increased by means of the headrest body since the support surface itself limits an impact of the head during a rear impact.

An embodiment of the invention makes provision for the support elements to be designed as ribs. For example, the support elements are designed as transverse ribs which extend between two longitudinal sides of the frame. The transverse ribs are arranged here in the interior of the frame and form a central region and the support surface of the headrest body. The transverse ribs can be of rectilinear or angled or wavy design in longitudinal orientation. In cross section, the transverse ribs have a round or oval or flat shape.

An alternative embodiment of the invention makes provision for the support elements to be designed as longitudinal ribs which extend between two transverse sides of the frame. The longitudinal ribs are arranged here in the interior of the frame and form a central region and the support surface of the headrest body. The longitudinal ribs can be of rectilinear or angled or wavy design in longitudinal orientation. In cross section, the longitudinal ribs have a round or oval or flat shape.

A further alternative embodiment makes provision for the support element to be designed as a network of transverse and longitudinal ribs.

According to a further alternative embodiment, the support elements are designed as individual supports which extend away from the frame. The individual supports are designed, for example, as pads composed of one or more different materials. For example, that region of the pad which forms the support surface is cushioned or is provided with a cushion. Furthermore, the support element or the support elements designed as (an) individual support(s) is or are mounted flexibly. For example, the support elements are fastened to the frame by means of elastically deformable connections which permit ergonomic adaptation of the support surface. In particular, the support element or the support elements can be positioned in such a manner that it/they forms/form an ergonomically configured support surface. In addition or alternatively, the individual support(s) itself/ themselves can be designed in an ergonomically shaped manner in order to form a correspondingly ergonomically configured support surface.

According to a further embodiment, the headrest body has a concave shape in cross section. For example, the support surface and therefore the central region of the headrest body is curved inward and designed in the manner of a saddle, and therefore a shape is formed corresponding to the head lying against the headrest body.

According to a development, the frame has a profiling in cross section, in particular an S or meandering shape, one or more notchings or grooves. By this means, the frame has sufficient strength and flexural rigidity. The frame is for example an outer frame. Furthermore, the frame can be designed to completely encircle the support surface.

For the fastening of the headrest body for example to a structural element, such as a seatback structure or a body structure, at least one headrest holder protrudes from the frame of the headrest body. Depending on the type of the headrest body, the headrest holder here can be of single-part design, wherein, in this embodiment, the headrest holder is connected to the structural element, in particular to a seatback structure or a body structure. In other words: the headrest holder is designed without a carrier. In particular when the headrest holder is formed from a fiber composite material, in particular a glass-fiber-reinforced plastic, an additional carrier can be omitted.

Alternatively, the headrest holder can be of two- or multi-part design. In this embodiment, the headrest holder is designed as a receiving element for receiving at least one carrier and is molded onto the headrest body. The carrier can be a metal carrier, in particular a holding rod.

The carrier is of profiled shape in cross section. In one possible embodiment, the at least one carrier is of S- or meandering shaped in cross section. The carrier can be produced particularly simply as a roll-shaped profile, in particular metal profile without an additional coating.

Furthermore, the headrest holder and optionally the carrier is in each case angled at least once in the longitudinal extent. The respective a body-side angled end of the headrest holder and of the carrier is in this case molded onto the headrest body or fixed in the headrest body, in particular fixed releasably. The respectively opposite and structure-side angled end of the headrest holder and optionally of the carrier is fixed releasably in the structural element, in particular in a seatback structure or body structure. For example, the carrier is fixed releasably in the headrest body, in particular in the headrest holder, with a form-fit and/or force-fit, for example by means of a press-fit or form-fit connection. The headrest holder and optionally the carrier, for example holding rod(s), are angled here by the same angle in such a manner that the headrest body in the assembled state is arranged in an ergonomically appropriate position with respect to a head of a user.

The headrest according to the invention comprises the previously described headrest body and the previously described headrest holder, wherein a connecting part is provided for connecting the headrest body to a structural element, in particular to a seat structure, a backrest structure or a body structure. In particular, the headrest holder is releasably connected to a structural holder by means of a pin or bolt connection.

A further embodiment makes provision for a height adjustment device to additionally be provided. As a result, a height of the headrest is adjustable. An advantage of this embodiment is, for example, adaptation to the head height of a person, as a result of which the comfort and force transmission and force dissipation in the event of a collision are improved.

The advantages achieved with the invention consist in particular in that a headrest which can be produced particularly simply and is cost-effective is made possible with simultaneously improved supporting comfort and headrest design. The headrest is suitable not only for use in the automotive sector but also in transportation or on other equipment items, such as furniture.

Exemplary embodiments of the invention are explained in more detail with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7A is a schematic sectional side view of an exemplary embodiment for a headrest holder;

FIG. 7B is a schematic sectional side view of an exemplary embodiment for a headrest holder;

FIG. 7C is a schematic sectional side view of an exemplary embodiment for a headrest holder;

DESCRIPTION OF THE PREFERRED EMBODIMENTS

Figure 1A:
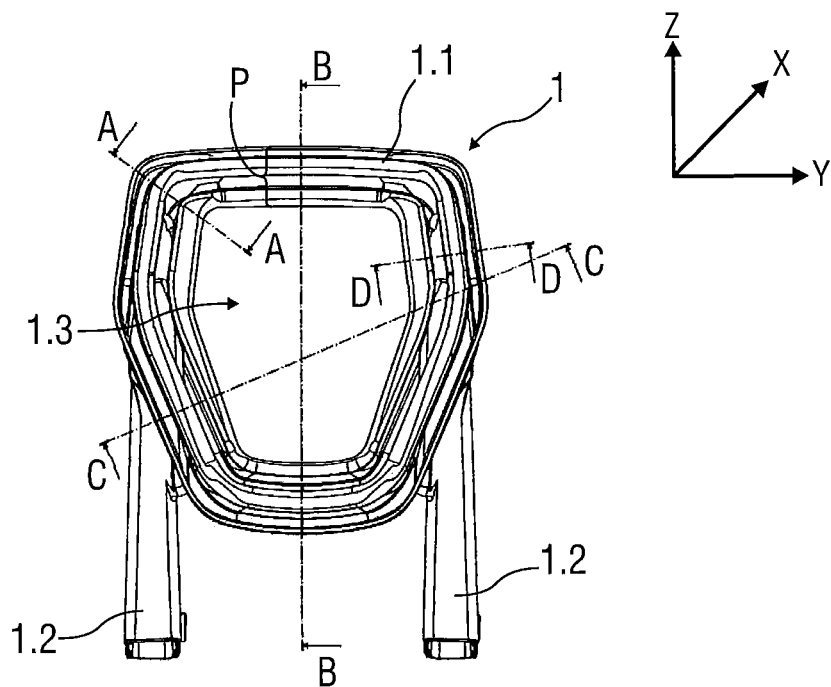
FIG. 1A is a schematic front view of an exemplary embodiment for a headrest body.

Referring to the drawings, mutually corresponding parts are provided with the same reference signs in all of the Figures.

FIG. 1A schematically shows, in top view, an exemplary embodiment for a headrest body 1.

The headrest body 1 is of integral design and comprises at least one frame 1.1 and a headrest holder 1.2 protruding from the latter, in particular vertically downward. The integral headrest body 1 is formed from a plastics material, in particular from a material free from foamed materials, or from a composite material, in particular a fiber composite material, such as a glass-fiber-reinforced plastic, by primary forming.

The frame 1.1 is an outer frame.

The headrest body 1 is formed, for example, from an impact-resistant elasto-plastic or thermoplastic material, for example a thermoplastic urethane, polyurethane or polypropylene. In one possible embodiment, the headrest body 1 is formed by injection molding of a material free of foamed plastics materials or by multi-component injection molding from a plurality of plastics materials. The headrest body 1 and the headrest holder 1.2 can also be formed from a fiber composite material. Alternatively, the headrest body can also be formed by deformation, in particular compressive deformation, such as die forging, compression molding or stamping.

The frame 1.1 is formed encircling a support surface 1.3 and has two longitudinal sides and two transverse sides. In top view here, the upper transverse side is wider than the lower transverse side. The two longitudinal sides are of mirror-symmetrical design and are angled inward in the longitudinal extent.

The frame 1.1 has a profiling P in an encircling manner. The profiling P of the frame 1.1 in particular has a meandering or loop shape. Alternatively, the profiling P can have an S shape or can be provided in hollow form with reinforcements or with one or more notchings or grooves. For example, the frame 1.1 has a concave shape. By this means, the frame 1.1 has sufficient strength and flexural rigidity.

The headrest body 1 has a long support surface 1.3 in the Z direction Z, and therefore the headrest body 1 is adapted and suitable for different head heights.

The support surface 1.3 (also called contact surface) is ergonomically shaped here, and therefore a head lying or resting thereagainst is stabilized in its position. In order to support such a stabilization of the head lying thereagainst, the support surface 1.3 is shaped concavely.

In the installed state of the headrest body 1, the highest position thereof is at approximately 830 mm or the lowest position thereof is at greater than 780 mm above what is referred to as the hip point (H-point=point on the median plane of the person located in the theoretical point of intersection of the torso axis and the thigh longitudinal axis projected onto the plane). The minimum height of the headrest body 1 is 112 mm in the case of an adjustable headrest with a, for example, maximum adjustment of 50 mm, and 182 mm in the case of an unadjustable headrest.

The headrest body 1 is configured here in such a manner that, in the event of an action of force of 50 N, the headrest body 1 is moved approximately 15 mm in the X direction X and Z direction Z and the position of a head resting/lying thereagainst is approximately maintained. Furthermore, in the event of an action of force within a range of 900 N to 1100 N, the headrest body 1 has a deformation of greater than 7.5 mm, in particular in the event of an action of force of 990 N a deformation of approximately 8 mm, and, in the event of an action of force of 1068 N a deformation of approximately 9.6 mm.

Figure 1B:
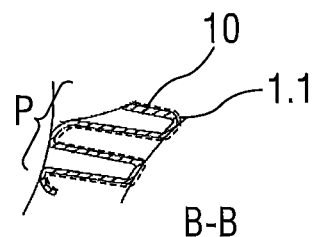
FIG. 1B is a schematic longitudinal sectional view of the exemplary embodiment for a headrest body.
Figure 1B:
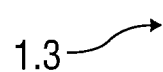
Figure 1B:
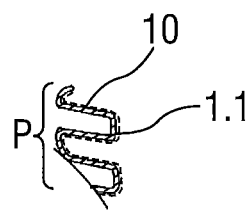

FIG. 1B shows the headrest body 1 according to FIG. 1A in longitudinal section. In the exemplary embodiment, the profiling P of the frame 1.1 has a meandering or looping shape at least in section. Alternatively, the profiling P can have an S shape or can be provided in hollow form with reinforcements or with one or more notchings or grooves. Said notchings or grooves result in a rib formation. By this means, the frame 1.1 has sufficient strength and flexural rigidity.

The inner region of the headrest body 1, which inner region is surrounded by the frame 1.1, forms the support surface 1.3. The support surface 1.3 can be designed in different ways, as described below.

In one possible embodiment, the headrest body 1 is of single-part and cushion-free design.

The headrest body 1 can optionally be provided with a cushioning 10. The cushioning 10 has in particular a thickness of less than 20 mm, in particular less than 15 mm. Alternatively, the cushioning 10 can have a thickness of 5 mm to 10 mm. Such a cushion-free headrest body 1 or such a headrest body 1 with a small cushioning 10 of less than 20 mm has a high degree of comfort with a simultaneously high degree of safety with the head being supported laterally.

The optional thin cushioning 10 is shown by way of example in FIG. 2A, but can also be used in all of the embodiments below. However, it can also be omitted, and therefore the headrest body 1 can be of single-part and cushion-free design.

Figure 2A:
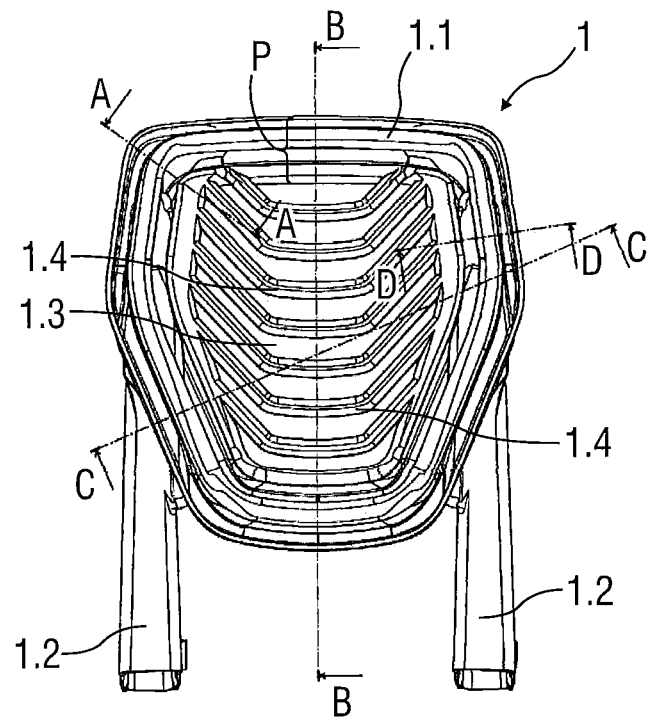
FIG. 2A is a schematic front view of a further exemplary embodiment for a headrest body.
Figure 2B:
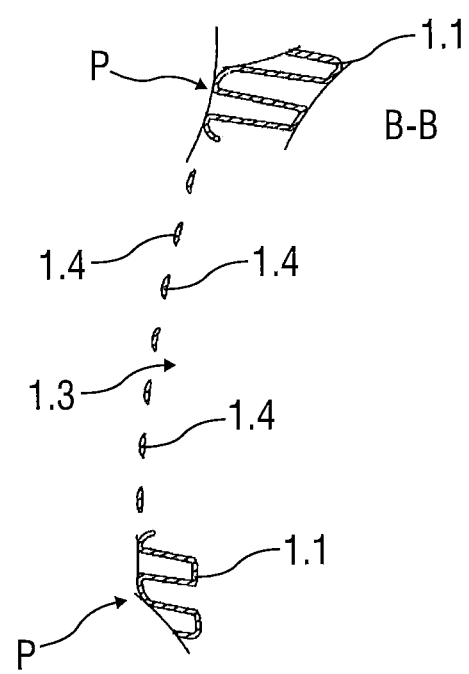
FIG. 2B is a schematic longitudinal sectional view of the further exemplary embodiment for a headrest body.

FIGS. 2A and 2B schematically show, in top view and in longitudinal section, an exemplary embodiment for a headrest body 1 with a plurality of inner flexible support elements 1.4 forming the support surface 1.3.

The headrest body 1 is formed here with the frame 1.1, the headrest holder 1.2 and the support elements 1.4 as an integral, injection molded component composed of a foam-free material or a composite material.

The support elements 1.4 extend between the two longitudinal sides of the frame 1.1 and form the support surface 1.3 of the headrest body 1. The support elements 1.4 are designed as transverse ribs.

In the exemplary embodiment shown, the support elements 1.4 have a central rectilinear region and two end regions which are angled therefrom and are connected to the frame 1.1. The support elements 1.4 therefore have a U-shape.

FIG. 2B shows, in longitudinal section, the profiling P of the frame 1.1 according to FIG. 2A, the frame being designed analogously to the frame 1.1 of FIG. 1A. The support elements 1.4 are arranged in the region of the support surface 1.3. As illustrated in the section, the support elements 1.4 which are designed as ribs have a substantially oval or slightly outwardly curved cross-sectional shape. This increases the support comfort and the stabilization of the head.

Figure 3A:
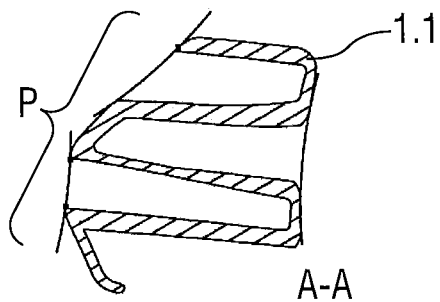
FIG. 3A is a schematic sectional view of the headrest body according to FIG. 1A or 2A.
Figure 3B:
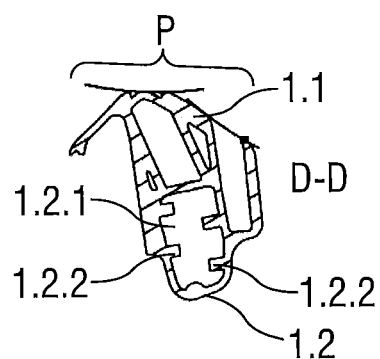
FIG. 3B is another schematic sectional view of the headrest body according to FIG. 1A or 2A.
Figure 3C:
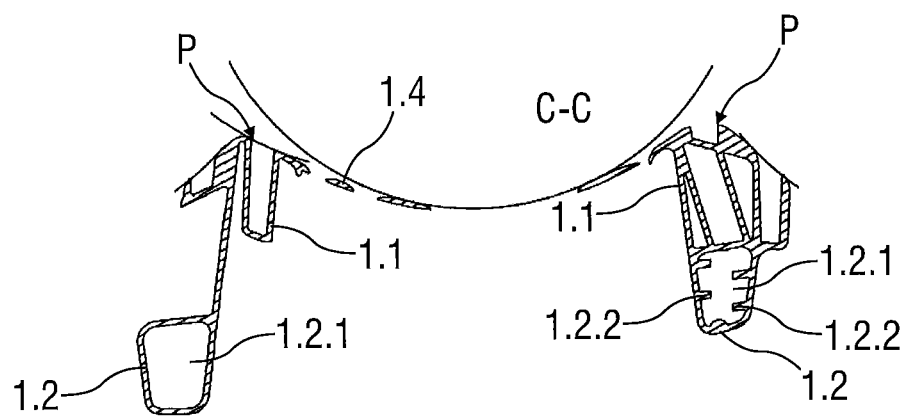
FIG. 3C is another schematic sectional view of the headrest body according to FIG. 1A or 2A.

FIGS. 3A to 3C schematically show various sectional views of the headrest body 1 according to FIG. 1A or 2A.

FIG. 3A thus shows a section A-A through a portion of the frame 1.1 with a meandering or looping profiling P in the region between the upper transverse side and one of the longitudinal sides of the frame 1.1.

FIG. 3B shows a section D-D through a portion of the frame 1.1 and the headrest holder 1.2. The profiling P of the frame 1.1 is of hollow and U-shaped design in this portion.

In this portion, that end of the frame 1.1 which points away from the support surface 1.3 is adjoined by a body-side end of the headrest holder 1.2. The body-side end of the headrest holder 1.2 is of hollow design and is provided with webs 1.2.2 protruding inward into a cavity 1.2.1.

Figure 12:
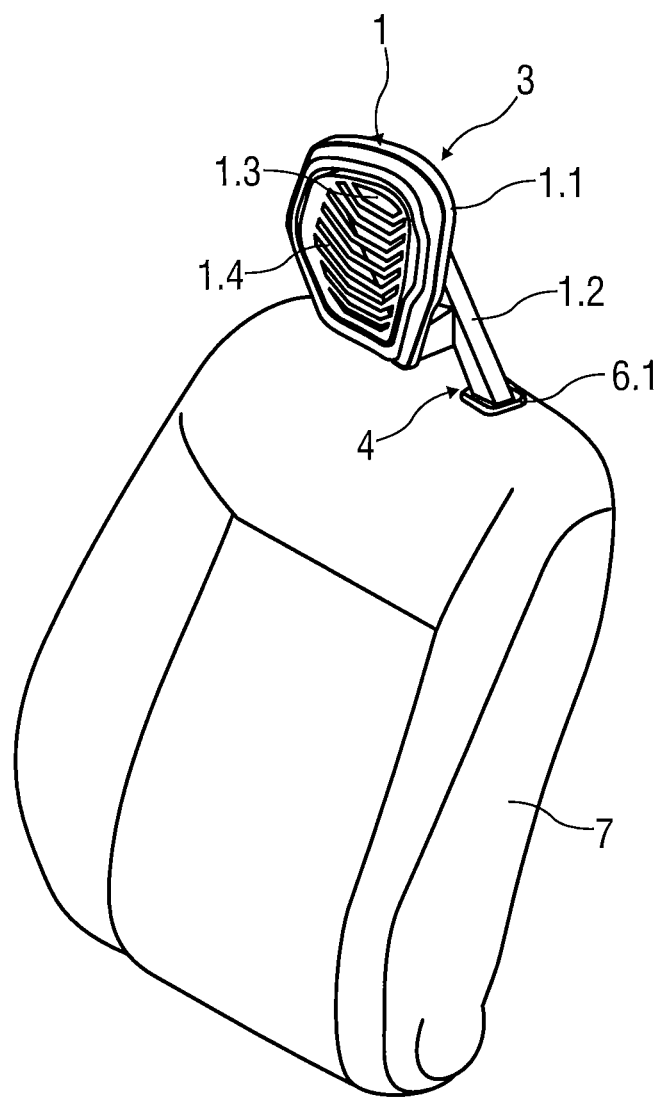
FIG. 12 is a schematic perspective illustration of a seatback with a headrest arranged thereon.

The headrest holder 1.2 can be designed here in such a manner that it can be fastened and fixed releasably to a structural element 7, which is illustrated in FIG. 12, without a carrier and therefore without an additional carrier. Such a carrier-free headrest holder 1.2 which is molded onto the headrest body 1 has inner reinforcing elements, such as webs 1.2.2 and/or ribs (not illustrated).

FIG. 3C shows an oblique section through the headrest holder 1.2 in the region of a structure-side, for example backrest-side end, the frame 1.1, the support elements 1.4, an opposite region of the frame 1.1 and the body-side end of the headrest holder 1.2.

As shown, the headrest holder 1.2 has the cavity 1.2.1 without webs 1.2.2 (is free from webs) in the region of the structure-side, in particular backrest-side end in cross section. Depending on the configuration of the headrest holder 1.2 (with or without a carrier), the latter can have a decreasing circumference in the direction of the body-side end in cross section. In other words: the cross section of the backrest-side end is greater than the cross section of the body-side end of the headrest holder 1.2. The headrest holder 1.2 is of mirror-symmetrical design here.

The headrest holder 1.2 can optionally be designed here as a receptacle for a carrier 2. In this embodiment, the number of webs 1.2.2 can be reduced.

The support of a head 11 is indicated in FIG. 3C. In this case, the frame 1.1 has, at the transition to the support surface 1.3 with the flexible support elements 1.4, a supporting means 12 which points in the direction of the support surface 1.3 and is of flexible design. The head 11 is thereby enclosed and is supported laterally. By means of an extension on the frame 1.1, the lateral supporting means 12 of the head 11 avoids hard point-type supports of the head 11 on the headrest body 1. The support elements 1.4 serve for the comfort and design and can be freely configured. The supporting means 12 serve for enlarging the support surface 1.3 and the lateral holding of the head 11.

Figure 3D:
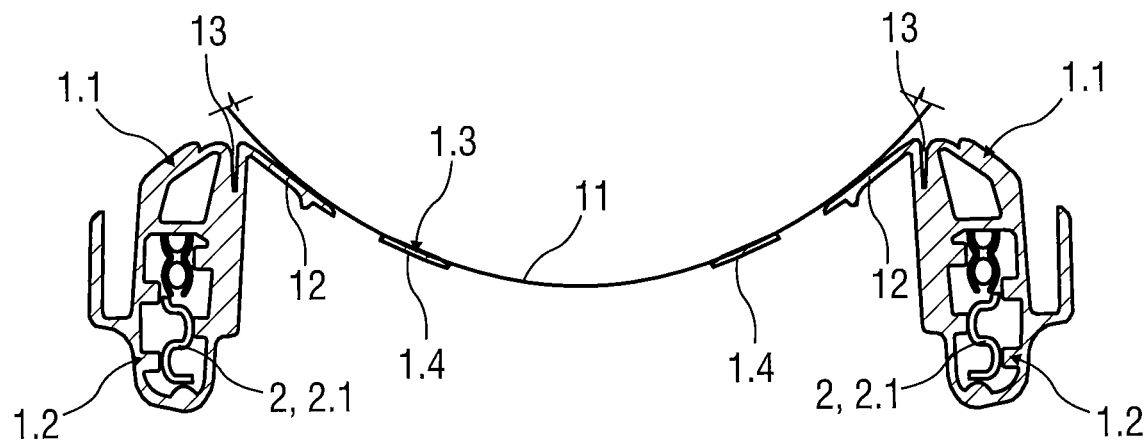
FIG. 3D is a schematic sectional view of a headrest body with a notch between the frame and lateral supporting means.

In addition, a notch 13 as a load path for distributing the forces can be introduced between the frame 1.1 and the lateral supporting means 12 projecting into the support surface 1.3, as shown in FIG. 3D.

Figure 4A:
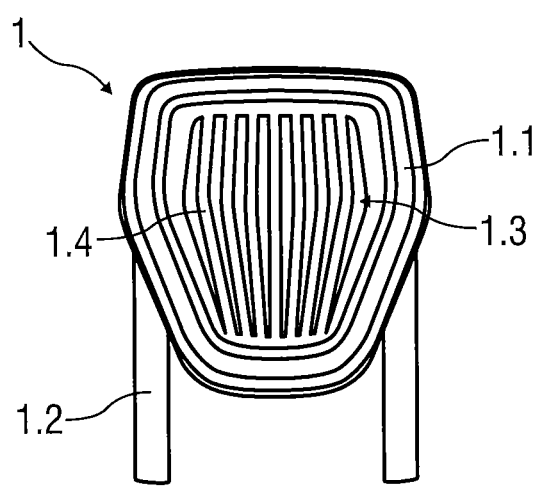
FIG. 4A is a schematic front view of one of various exemplary embodiments for headrest bodies with ribs.
Figure 4B:
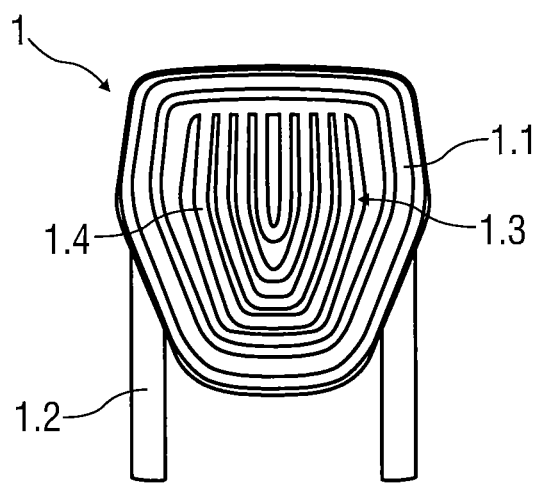
FIG. 4B is a schematic front view of another of various exemplary embodiments for headrest bodies with ribs.
Figure 4C:
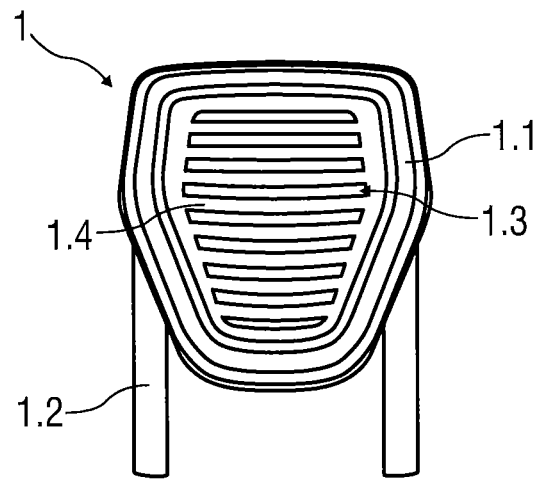
FIG. 4C is a schematic front view of another of various exemplary embodiments for headrest bodies with ribs.
Figure 4D:
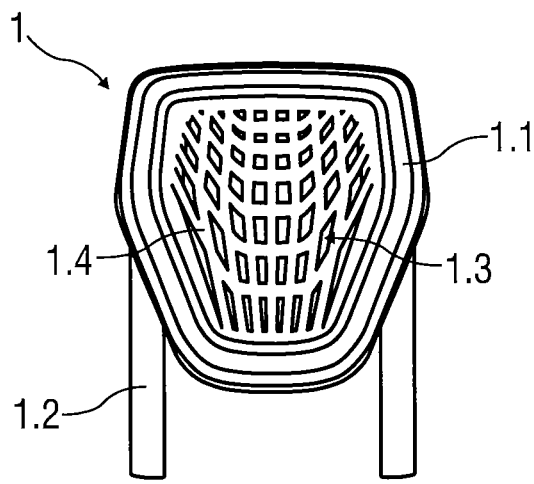
FIG. 4D is a schematic front view of another of various exemplary embodiments for headrest bodies with ribs.

FIGS. 4A to 4D schematically show, in top view, various exemplary embodiments for headrest bodies 1 with various support elements 1.4 in the form of longitudinal ribs (FIG. 4A), U-shaped ribs (FIG. 4B), transverse ribs (FIG. 4C) and a network of longitudinal and transverse ribs (FIG. 4D).

The respective frame 1.1 is shaped concavely here and can be designed analogously to the frame 1.1 of FIG. 1A. The profiling P of the frame 1.1 is encircling and has a meandering or loop shape at least in section. Alternatively, the profiling P can have an S shape or can be provided in hollow form with reinforcements or with one or more notchings or grooves. The inner rib-shaped support elements 1.4 are shaped and arranged in such a manner that they form an ergonomically configured, in particular a concavely shaped support surface 1.3 for a head lying thereagainst.

For this purpose, the ribs can be of rectilinear or angled or wavy design in a transverse and/or longitudinal orientation. In addition, the ribs have a round or oval or flat shape in cross section.

Figure 5A:
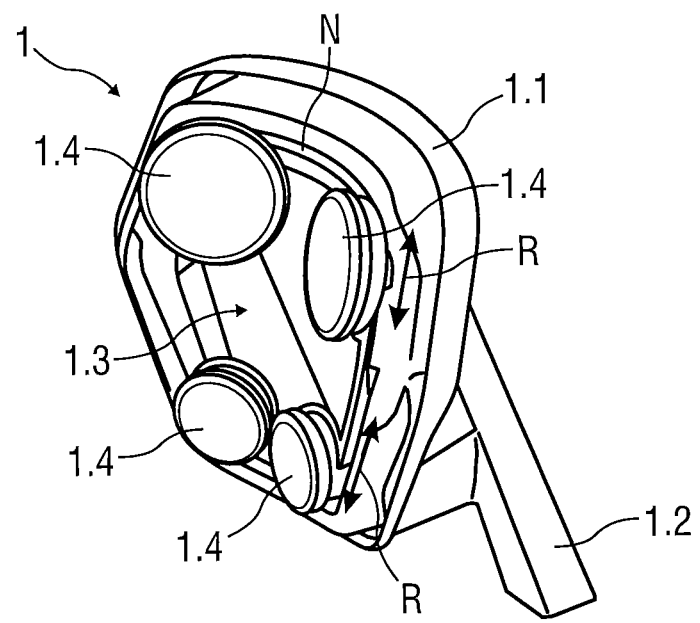
FIG. 5A is a schematic perspective view of one of further various exemplary embodiments for headrest bodies with pads.

FIG. 5A shows a further alternative embodiment of a multi-part headrest body 1 with support elements 1.4 which are designed as individual supports and are mounted flexibly. In this case, the support elements 1.4 extend away from the frame 1.1 in the direction of the support surface 1.3 and form the latter. For the shaping of the ergonomic support surface 1.3, the individual supports or pads are mounted flexibly by means of a joint, for example a plastics joint. For example, the individual supports are fastened to the frame 1.1 by means of elastically deformable connections. Additionally or alternatively, the individual supports themselves can be designed to be ergonomically shaped.

The individual supports are designed, for example, as pads composed of one or more different materials. In addition, that region of the pad which forms the support surface 1.3 can be cushioned or provided with a cushion. For example, the support elements 1.4 are of multi-layered design and comprise a carrier with a cushion arranged thereon as the support surface 1.3. The pad-shaped support elements 1.4 can also be arranged on the frame 1.1 in an adjustable manner, in particular in a displaceable manner in at least one groove N according to the arrows R.

As is apparent in the perspective in FIG. 5A, the headrest body 1 has a concave shape. The frame 1.1 is firstly shaped concavely here. The support elements 1.4 are arranged or adjusted in such a manner that they form a concavely shaped support surface 1.3 for a head lying thereagainst. For example, the pads are arranged and adjusted in a manner inclined inward such that the support surface 1.3 and therefore the central region of the headrest body 1 is curved inward and is designed in the manner of a saddle, thus forming a shape corresponding to the head lying against the headrest body 1.

Figure 5B:
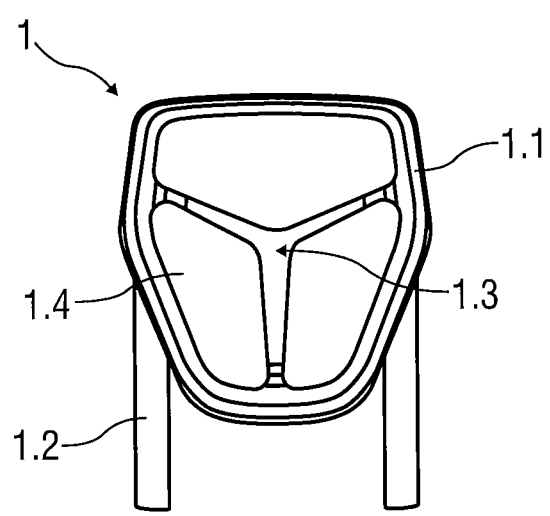
FIG. 5B is a schematic perspective view of another of further various exemplary embodiments for headrest bodies with pads.
Figure 5C:
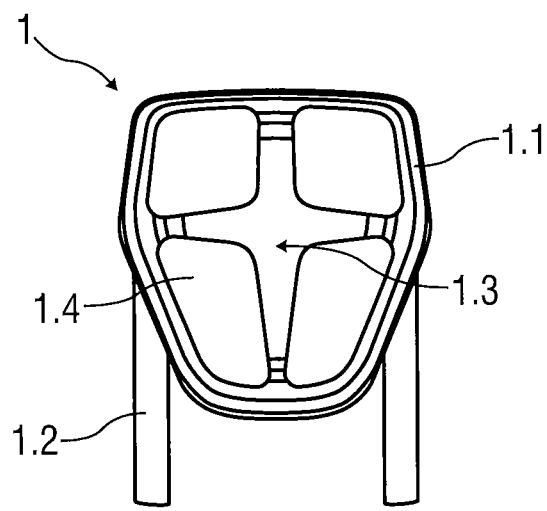
FIG. 5C is a schematic perspective view of another of further various exemplary embodiments for headrest bodies with pads.
Figure 5D:
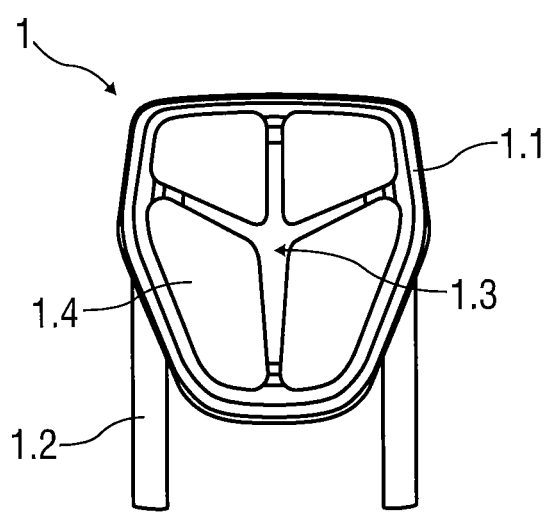
FIG. 5D is a schematic perspective view of another of further various exemplary embodiments for headrest bodies with pads.

FIGS. 5B to 5F show further headrest bodies 1 with various pad-shaped support elements 1.4 which differ in number, shape and/or arrangement. FIG. 5B thus shows a headrest body 1 with three large pads as support elements 1.4. FIGS. 5C and 5D each show a headrest body 1 with four support elements 1.4.

As shown in FIGS. 5A to 5F, the support elements 1.4 can be of circular, triangular or square design. They can be designed such that they curve inward, or can have another suitable surface shape.

Figure 5E:
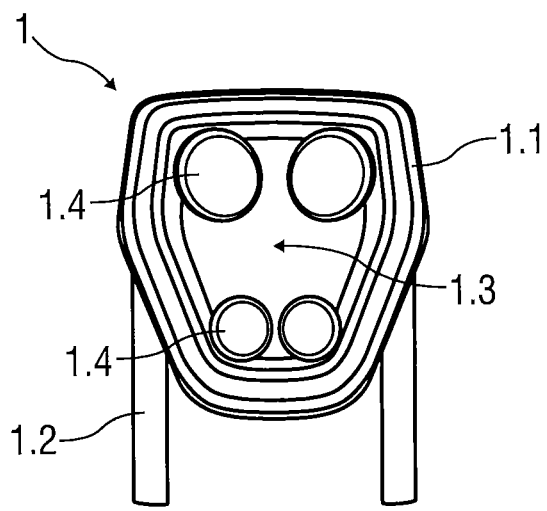
FIG. 5E is a schematic perspective view of another of further various exemplary embodiments for headrest bodies with pads.
Figure 5F:
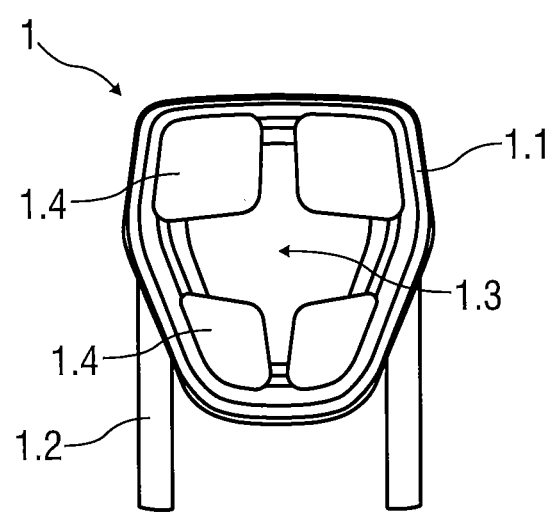
FIG. 5F is a schematic perspective view of another of further various exemplary embodiments for headrest bodies with pads.

FIGS. 5E and 5F each show a headrest body 1 with smaller pads as support elements 1.4 which are arranged spaced apart from one another and inclined inward in the direction of the support surface 1.3.

Figure 6A:
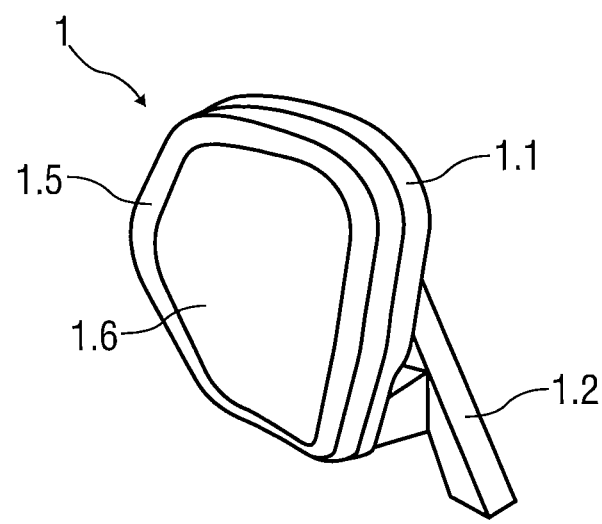
FIG. 6A is a schematic perspective view of a further exemplary embodiment for a headrest body.
Figure 6B:
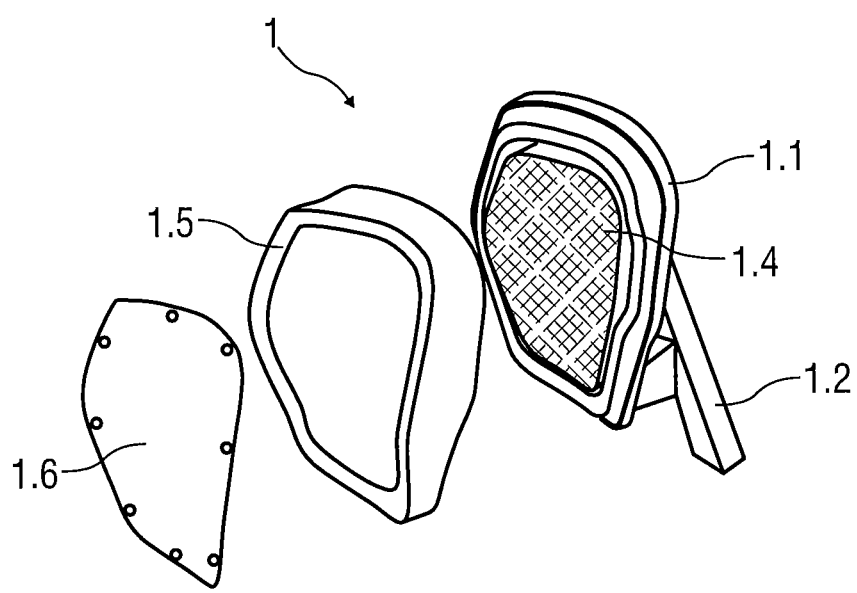
FIG. 6B is a schematic exploded illustration of the further exemplary embodiment for a headrest body according to FIG. 6A.

FIGS. 6A and 6B schematically show, in a perspective view and exploded illustration, a further exemplary embodiment for a headrest body 1 with an individual support element 1.4 in the form of a pad filling the interior of the frame 1.1. The pad is understood here as meaning in particular a wall completely filling the frame 1.1. The wall is formed, for example, together with the frame 1.1 as an integral, injection molded component composed of a foam-free material or a composite material. The headrest body 1 is formed as one piece consisting of frame 1.1, headrest holder 1.2 and the one support element 1.4.

In addition, a holding frame 1.5 can be fastenable releasably, in particular can be pluggable and latchable, to the headrest body 1 in order to improve the comfort, and a cover 1.6, in particular a fabric cover or a woven fabric, is fastenable releasably in turn to the holding frame.

In further embodiments, the headrest body 1 together with the frame 1.1, the support element 1.4 and the headrest holder 1.2 can be formed from a plastics material or a composite material as an individual part which can be covered with a cover 1.6 or with another soft material.

The headrest body 1 described previously and below is suitable for use in the automotive sector or in transportation or in the furniture sector.

FIGS. 7A to 7C schematically show, in section and side views, an exemplary embodiment for a headrest holder 1.2.

Figure 8A:
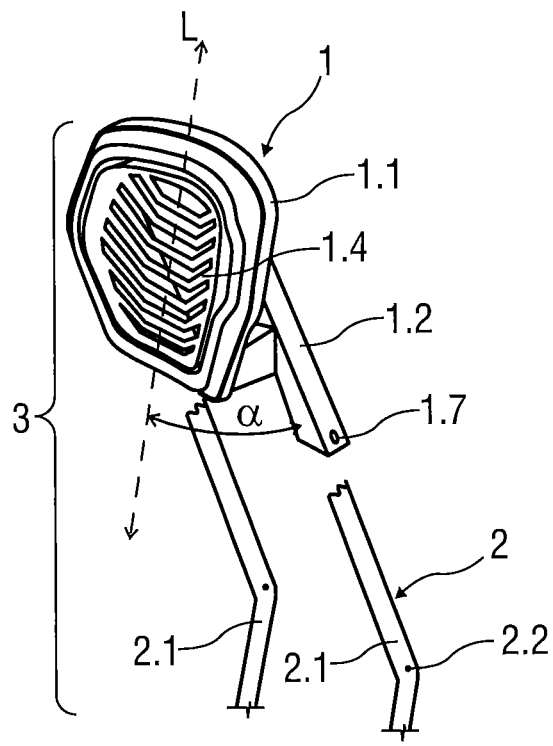
FIG. 8A is a schematic exploded illustration of an exemplary embodiment for a headrest body with a molded-on headrest holder with a fixable carrier and for a headrest body with a molded-on, carrier-free headrest holder.

As described above, the headrest holder 1.2 can comprise a carrier 2. The carrier 2 can comprise one holding rod 2.1 (as shown in FIG. 7A) or two holding rods 2.1 (as illustrated in FIG. 8A).

The carrier 2 is of profiled design. In the single-part embodiment, the carrier 2 can be designed as a U-shaped holding rod (not illustrated specifically) which is profiled in cross section. Alternatively, the carrier 2 can be designed as two holding rods 2.1 which are profiled in cross section and are optionally angled in longitudinal orientation.

FIGS. 7A and 7C show the carrier 2, in particular one of the holding rods 2.1 in a longitudinal extent. The holding rod 2.1 here is angled at least once in the longitudinal extent (FIG. 7A).

FIG. 7B shows the carrier 2, in particular the holding rod 2.1, in cross section. In one possible embodiment, the respective holding rod 2.1 is of S-shaped or meandering or looped design in cross section. The holding rod 2.1 is formed from a roll-shaped metal profile.

FIG. 8A schematically shows, in an exploded illustration, an exemplary embodiment for a headrest 3 which is formed from an integral headrest body 1, which is produced, for example, from polyurethane, and a headrest holder 1.2. The headrest holder 1.2 is designed as a receptacle for the carrier 2 formed from two holding rods 2.1, and is molded onto the frame 1.1 of the headrest body 1 in such a manner that said headrest holder 1.2 run away from the frame 1.1 at a predetermined angle α with respect to the longitudinal axis L of the headrest body 1 such that the support surface 1.3 is spaced apart from the structure-side, in particular backrest-side end of the receiving elements 1.2 and is arranged substantially parallel to the longitudinal axis L.

The holding rods 2.1 are introducible with an angled rod end in the headrest body 1 in the headrest holder 1.2 and fixable, in particular releasably fixable, there, in particular by means of a press-fit or latching connection. In this case, the headrest holder 1.2 has a cross-sectional shape corresponding to the cross-sectional shape of the holding rods 2.1.

Figure 8B:
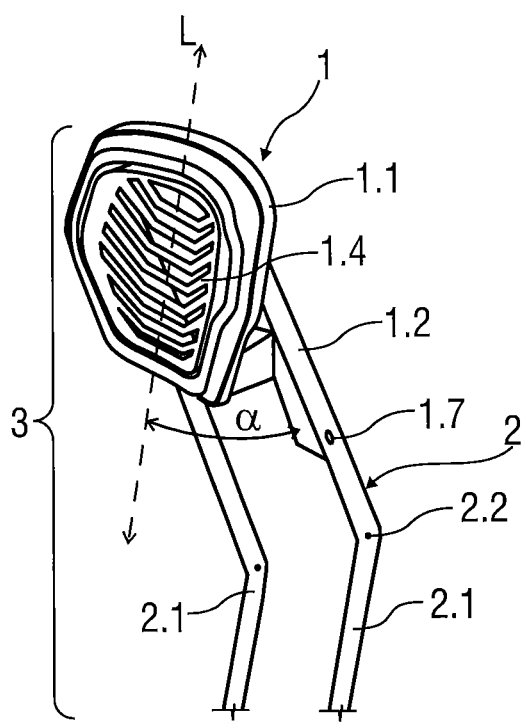
FIG. 8B is a schematic perspective view of the exemplary embodiment for a headrest body with a molded-on headrest holder with a fixable carrier and for a headrest body with a molded-on, carrier-free headrest holder.

FIG. 8B schematically shows, in an exploded illustration, an alternative embodiment for a headrest 3 which consists of an integral headrest body 1 produced, for example, from polyurethane. The molded-on headrest holder 1.2 is designed here without a carrier. For this purpose, the headrest holder 1.2 can be formed from a composite material, in particular a fiber-reinforced composite material, such as a glass-fiber-reinforced or carbon-fiber-reinforced plastic. In this embodiment, the headrest holder 1.1 itself forms a carrier element and accordingly has an internal rib or web structure consisting of webs 1.2.2.

Figure 9:
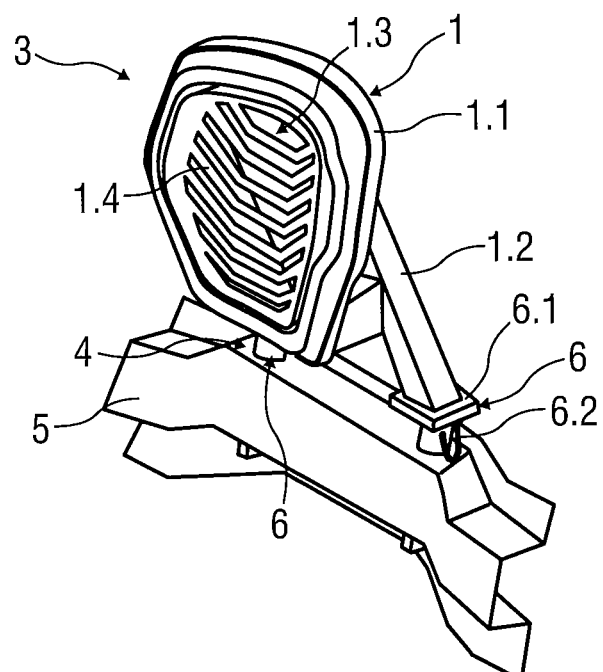
FIG. 9 is a schematic perspective view of a headrest fastened to a structural holder.

FIG. 9 schematically shows, in a perspective view, a headrest 3 which is fastened to a structural holder 4. The headrest holder 1.2 is fastenable in easily releasable manner here by means of a pin or bolt connection.

In order to fasten the headrest body 1 by means of the headrest holder 1.2 to the structural holder 4, the latter has holders 6 which are fixed in a backrest carrier 5, are designed, for example, as in particular cylindrical hollow profiles and have a cross-sectional shape corresponding to the cross-sectional shape of the holding rods 2.1.

In the direction of the headrest 3, the holders 6 have an enlarged support flange 6.1 against which in the assembled state of the headrest 3 and backrest carrier 5 the headrest holder 1.2 of the headrest body 1 lies.

For the releasable fastening of the holding rods 2.1 in the holders 6, the holders 6 and the holding rods 2.1 have connecting elements corresponding to each other. For example, the holders 6 each have a fastening element 6.2, for example a pin. The headrest holder 1.2 and the holding rods 2.1 arranged therein correspondingly each have a recess 1.7 or 2.2 corresponding to the pin, as illustrated in FIGS. 8A and 8B.

Figure 10:
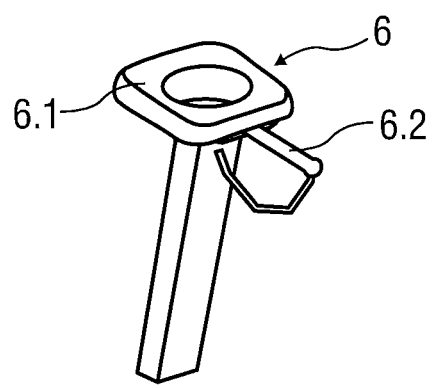
FIG. 10 is a schematic perspective view of an exemplary embodiment for a structural holder.

FIG. 10 shows an exemplary embodiment for one of the holders 6 of the structural holder 4. The holder 6 comprises the support flange 6.1 at the end pointing in the direction of the headrest 3, and the pin- or bolt-shaped fastening element 6.2. The fastening element 6.2 is held here on the holder 6 by means of a connection, and therefore the fastening element 6.2 cannot be lost. Alternative releasable connections, such as plug-in and latching connections, are likewise possible.

Figure 11A:
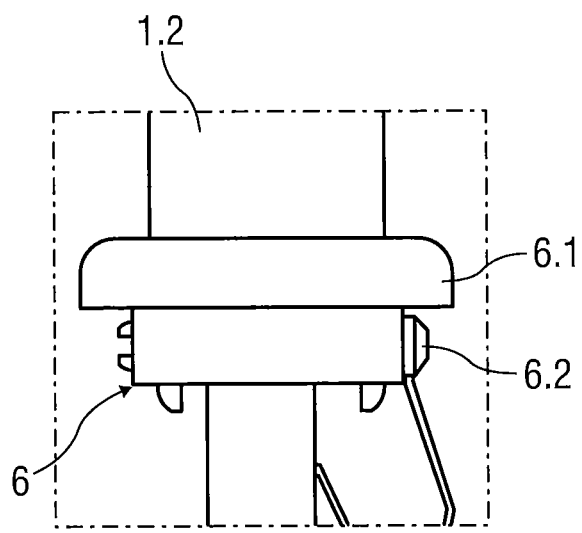
FIG. 11A is a schematic side view of the headrest holder fastened in the structural holder.
Figure 11B:
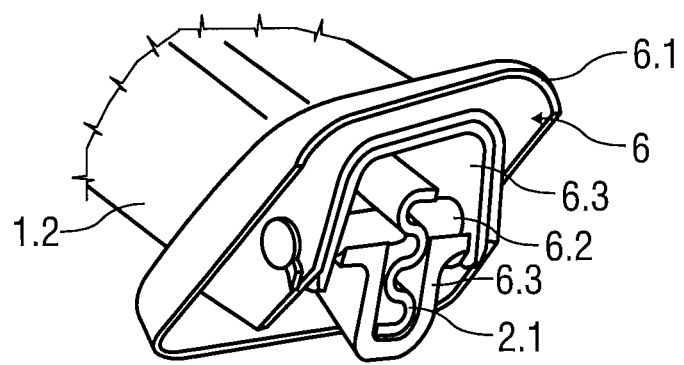
FIG. 11B is a schematic sectional illustration of the headrest holder fastened in the structural holder.
Figure 11C:
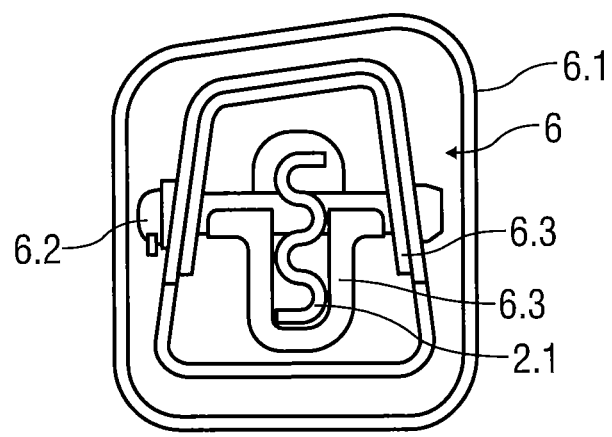
FIG. 11C is a schematic sectional illustration of the headrest holder fastened in the structural holder.

FIGS. 11A to 11C schematically show, in side view and in sectional illustrations, the headrest holder 1.2 which is fastened in the structural holder 4, in particular in one of the holders 6, in particular the carrier 2 of said headrest holder and the holding rod 2.1 of said carrier. The respective holder 6 can comprise on the inside here a u-shaped supporting element 6.3 in the region of the fastening.

FIG. 12 schematically shows, in a perspective illustration, the structural element 7 being a seatback with a headrest 3 arranged thereon. The rod end opposite the body-side rod end of the holding rods 2.1 is fixed releasably on the structural holder 4 of the seatback, as described in more detail for example with reference to FIGS. 10 to 11C.

In detail, the respective holding rod 2.1, in particular the headrest-side end thereof, is fixed releasably in the headrest body 1 with a form-fit and/or force-fit, for example by means of a press-fit or form-fit connection, and is releasably fixed in the structural holder 4 at the backrest-side end with a form-fit and/or force-fit, for example by means of a pin or bolt connection, for example a pin and socket connection.

Figure 13:
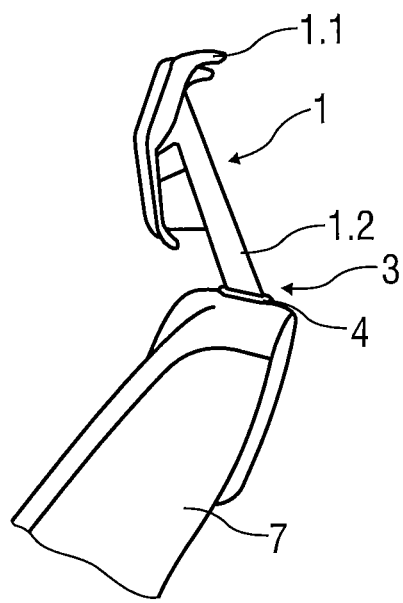
FIG. 13 is a schematic side view of the seatback according to FIG. 12.

FIG. 13 shows the headrest 3 arranged on the structural element 7, a seatback, in side view. The headrest holder 1.2 and the carrier 2, in particular the holding rods 2.1 thereof, are angled here from the longitudinal axis of the headrest body 1 at the same angle α in such a manner that the support surface 1.3 of the headrest body 1 in the assembled state is arranged in an ergonomically corresponding, in particular vertical position with respect to a head of a user.

Furthermore, the integral headrest body 1 is concave (curved inwardly) in the region of the support surface 1.3, wherein the frame 1.1, as can be seen in side view, is of angled design in the central region.

Figure 14A:
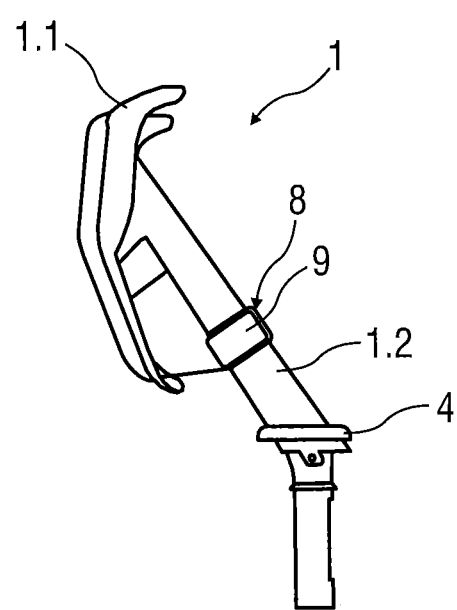
FIG. 14A is a schematic side view of a headrest with a height adjustment device.
Figure 14B:
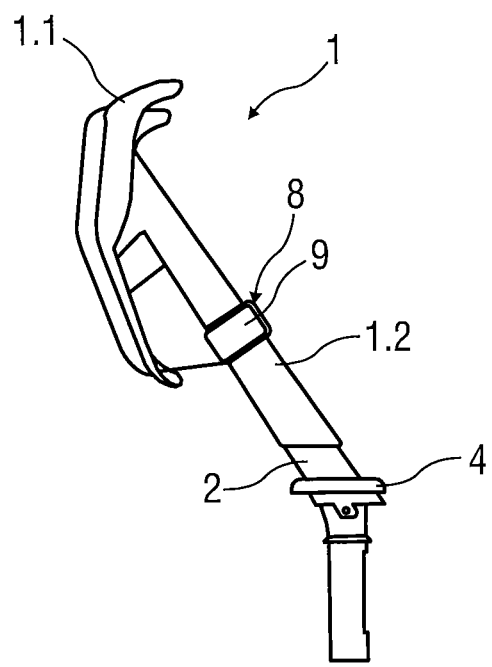
FIG. 14B is a schematic side view of the headrest with the height adjustment device.

FIGS. 14A and 14B schematically show, in side view, an exemplary embodiment for the headrest 3 with a height adjustment device 8. The height adjustment device 8 is designed as a conventional height adjuster and is arranged, for example, in the headrest holder 1.2 in a manner not illustrated specifically.

The headrest 3 is shown at different heights in FIGS. 14A and 14B. FIG. 14A in this case shows the headrest 3 in a retracted, in particular lower position, and FIG. 14B shows the headrest 3 in an extended, in particular upper position.

An actuating mechanism 9 of the height adjustment device 8 is mounted, for example laterally, in the headrest holder 1.2. In a further embodiment (not illustrated specifically), it is possible to attach the actuating mechanism 9 of the height adjustment device 8 at a different position of the headrest holder 1.2.

By actuation of the actuating mechanism 9, the height adjustment device 8 is unlocked. The headrest 3 can therefore be adjusted in its position along the carrier 2. After the adjustment is ended, the height adjustment device 8 is locked and therefore the headrest 3 is fixed in the adjusted position.

Figure 15:
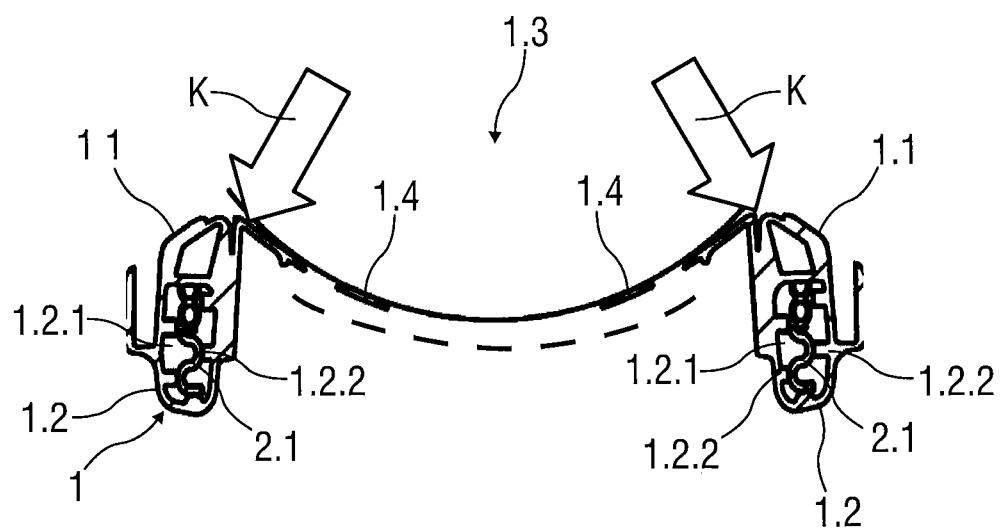
FIG. 15 is a schematic sectional illustration through the headrest body.

FIG. 15 schematically shows a sectional illustration through the headrest body 1 in detail. The load arrows K show the load paths which act on the frame 1.1 and do not act on the support surface 1.3.

While specific embodiments of the invention have been shown and described in detail to illustrate the application of the principles of the invention, it will be understood that the invention may be embodied otherwise without departing from such principles.

The invention claimed is:

1. A headrest body for a headrest, the headrest body being a single part and cushion-free design and the headrest body comprising:
   at least one frame encircling a support surface;
   at least one headrest holder protruding from the frame; and
   one or more inner flexible support elements forming the support surface, wherein the frame, the headrest holder and the support elements are formed as a single piece construction from a plastics material and/or a composite material by primary forming to form a single piece headrest body structure;
   wherein at least one continuous aperture extends through the flexible support elements through the support surface.

2. The headrest body as claimed in claim 1, wherein the support surface is ergonomically configured with an enlarged head support is provided, the one or more inner flexible support elements comprising a support element cross sectional shape, the support element cross sectional shape being different from the profiling of the frame.

3. The headrest body as claimed in claim 1, wherein the support elements are configured as ribs.

4. The headrest body as claimed in claim 1, wherein the one or more support elements are configured as an individual support layer mounted flexibly.

5. The headrest body as claimed in claim 4, wherein the at least one carrier is loop or meandering shaped in cross section.

6. The headrest body as claimed in claim 1, wherein the headrest holder comprises at least one carrier which is profiled in cross section.

7. A headrest comprising:
   a single part and cushion-free headrest body comprising:
   at least one frame encircling a support surface;
   at least one headrest holder protruding from the at least one frame; and
   one or more inner flexible support elements forming the support surface, the frame, the headrest holder and the support elements are formed as a single piece constructions from a plastics material and/or a composite material by primary forming to form a single piece headrest body structure;
   wherein at least one continuous aperture extends through the flexible support elements through the support surface.

8. The headrest as claimed in claim 7, wherein:
   the one or more inner flexible support elements comprise a support element cross sectional shape;
   the support element cross sectional shape is different from the profiling of the frame and
   the headrest holder is releasably connected to a carrier.

9. The headrest as claimed in claim 7, wherein:
the headrest holder is releasably connected to a structural element.

10. A headrest body for a headrest, the headrest body comprising:
a frame;
a plurality of inner flexible support elements, the inner flexible support elements comprising at least one of a plastics material and a composite material, each of the support elements defining a cushion-free and concavely shaped support surface, wherein the frame has a cross sectional contour, each of the inner flexible support elements comprising a support element cross sectional shape, the support element cross sectional shape being different from the cross sectional contour of the frame, the frame surrounding the cushion-free and concavely shaped support surface;
wherein at least one continuous aperture extends through the flexible support elements through the support surface.

11. The headrest body as claimed in claim 10, wherein the frame comprises a first longitudinal frame portion, a second longitudinal frame portion, a first transverse frame portion connected to the first longitudinal frame portion and the second longitudinal frame portion and a second transverse frame portion connected to the first longitudinal frame portion and the second longitudinal frame portion, wherein the plurality of inner flexible support elements are located between the first longitudinal frame portion, the second longitudinal frame portion, the first transverse frame portion and the second transverse frame portion.

12. The headrest body as claimed in claim 10, wherein the frame comprises a concave shape, at least a portion of the cross sectional contour comprising one of a loop shape and a meandering shape.

13. The headrest body as claimed in claim 10, wherein the support surface is ergonomically configured with an enlarged head support.

14. The headrest body as claimed in claim 10, wherein the support elements are configured as ribs.

15. The headrest body as claimed in claim 10, wherein the support elements are configured as an individual support layer mounted flexibly.

16. The headrest body as claimed in claim 10, further comprising at least one headrest holder protruding from the frame.

17. The headrest body as claimed in claim 16, wherein the headrest holder comprises at least one carrier which is profiled in cross section.

18. The headrest body as claimed in claim 17, wherein the at least one carrier is loop or meandering shaped in cross section.

* * * * *